United States Patent [19]

Black

[11] 4,412,509

[45] Nov. 1, 1983

[54] ENERGY CONVERSION SYSTEM AND COMPONENTS THEREOF

[76] Inventor: Robert B. Black, 2925 Denver St., Corpus Christi, Tex. 78404

[21] Appl. No.: 250,172

[22] Filed: Apr. 2, 1981

Related U.S. Application Data

[60] Division of Ser. No. 58,779, Jul. 19, 1979, abandoned, and a continuation of Ser. No. 46,240, Jun. 7, 1979, Pat. No. 4,271,789, which is a continuation-in-part of Ser. No. 813,667, Jul. 7, 1977, Pat. No. 4,199,831, which is a continuation-in-part of Ser. No. 794,044, May 5, 1977, abandoned, which is a continuation of Ser. No. 620,327, Oct. 3, 1975, abandoned, which is a division of Ser. No. 568,699, Apr. 16, 1975, abandoned, which is a continuation-in-part of Ser. No. 462,094, Apr. 18, 1974, Pat. No. 4,025,291, which is a division of Ser. No. 369,084, Jun. 11, 1973, abandoned, which is a division of Ser. No. 192,262, Oct. 26, 1971, Pat. No. 3,844,270.

[51] Int. Cl.$^3$ ............................................. F22B 5/00
[52] U.S. Cl. ........................................ 122/17; 122/43; 122/135 R; 122/136 R; 126/350 R; 165/83; 165/160
[58] Field of Search ...................... 122/16, 17, 43, 42, 122/136 R, 53, 68, 94 C, 94 A, 113, 130, 183, 266, 135; 165/160, 83; 126/350 R

[56] References Cited

U.S. PATENT DOCUMENTS

| 826,773 | 7/1906 | Engleitner | 165/160 X |
|---|---|---|---|
| 1,135,037 | 4/1915 | Meriam | 123/41.2 |
| 1,388,480 | 8/1921 | Paris | 60/309 |
| 1,489,501 | 4/1924 | Miner | 60/320 |
| 2,218,793 | 10/1940 | Horton et al. | 123/41.2 |
| 2,392,783 | 1/1946 | Stevens | 60/698 |
| 2,558,971 | 7/1951 | Lundstrum | 122/16 X |
| 2,612,745 | 10/1952 | Vecchio | 60/309 |
| 2,617,393 | 11/1952 | Peters | 126/350 R |
| 2,647,568 | 8/1953 | Sloan | 431/183 |
| 2,699,155 | 1/1955 | Olson et al. | 122/4 R X |
| 2,784,549 | 3/1957 | Henney | 60/320 |
| 2,834,405 | 5/1958 | Voorheis | 431/183 X |
| 3,267,985 | 8/1966 | Kitchen | 431/1 |
| 3,302,684 | 2/1967 | Banko | 431/183 R |
| 3,703,472 | 8/1965 | Brandt | 165/DIG. 18 |
| 3,709,473 | 1/1973 | Ito et al. | 126/350 R |
| 3,734,064 | 5/1973 | Cancilla et al. | 122/136 R |
| 3,775,976 | 12/1973 | Karig | 60/39.52 |
| 3,830,062 | 8/1974 | Morgan et al. | 60/618 |
| 3,850,231 | 11/1974 | Creek | 165/83 |

FOREIGN PATENT DOCUMENTS

| 698965 | 11/1930 | France | 165/160 |
|---|---|---|---|
| 1158706 | 1/1958 | France | 165/160 |
| 17516 | of 1910 | United Kingdom | 122/155 A |
| 148896 | 6/1921 | United Kingdom | 165/DIG. 18 |
| 333527 | 8/1930 | United Kingdom | 60/320 |
| 1244087 | 8/1971 | United Kingdom | 60/320 |

*Primary Examiner*—Edward G. Favors
*Attorney, Agent, or Firm*—Kenneth P. Synnestvedt

[57] ABSTRACT

The energy conversion system disclosed is especially adapted for use with hydrocarbon or fossil fuels, for instance natural gas, with which substantial quantities of water vapor are developed when the fuel is burned, for instance in an engine, such as a turbine or a cylinder and piston internal combustion engine. In the system according to the present invention increased efficiencies are achieved by employment of a special form of power package capable of much more effectively utilizing the waste heat of the exhaust gases than has been practicable heretofore. The application also discloses tube-in-tube type of heat exchangers for use in the disclosed and also in other energy conversion or transfer systems.

14 Claims, 10 Drawing Figures

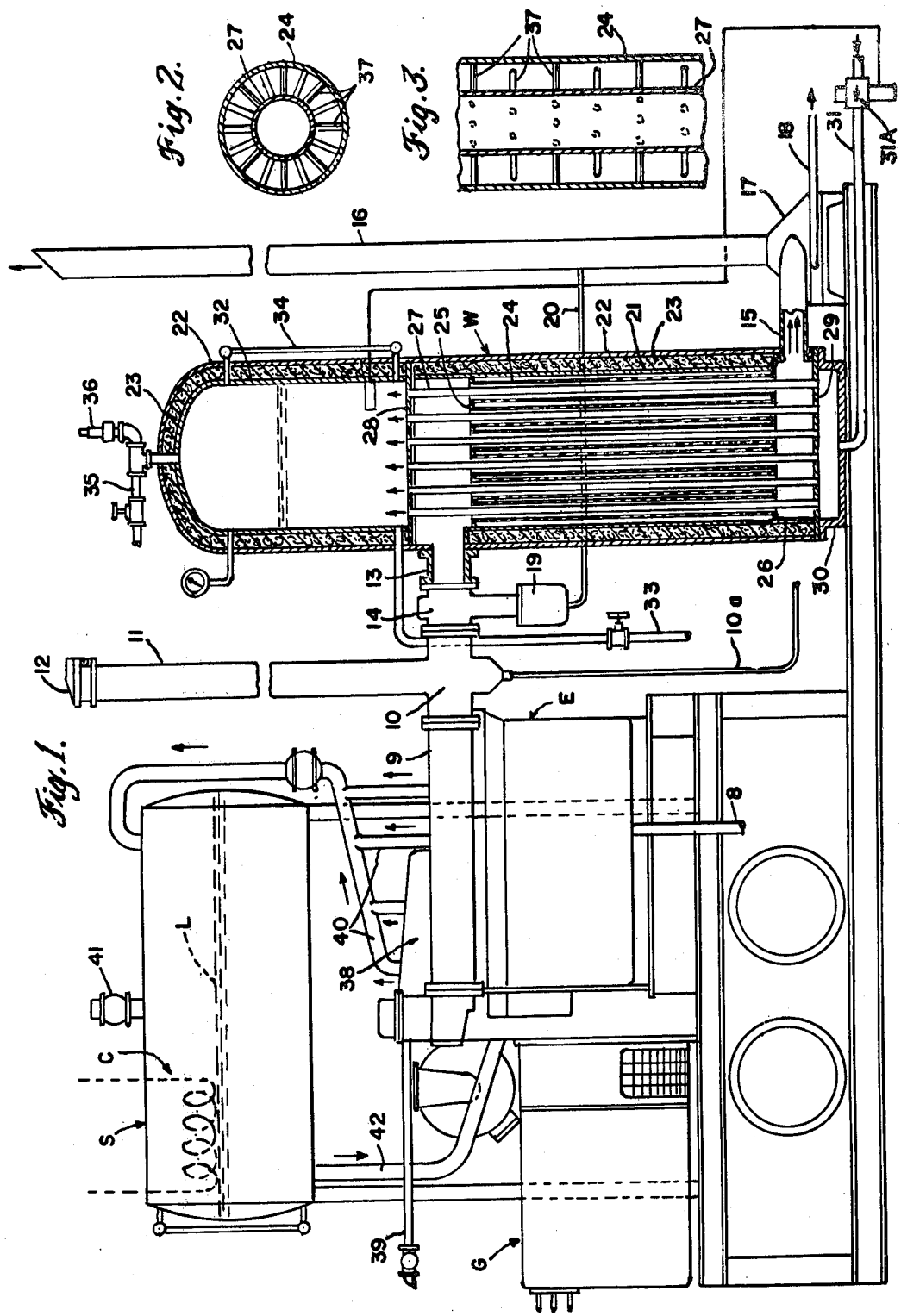

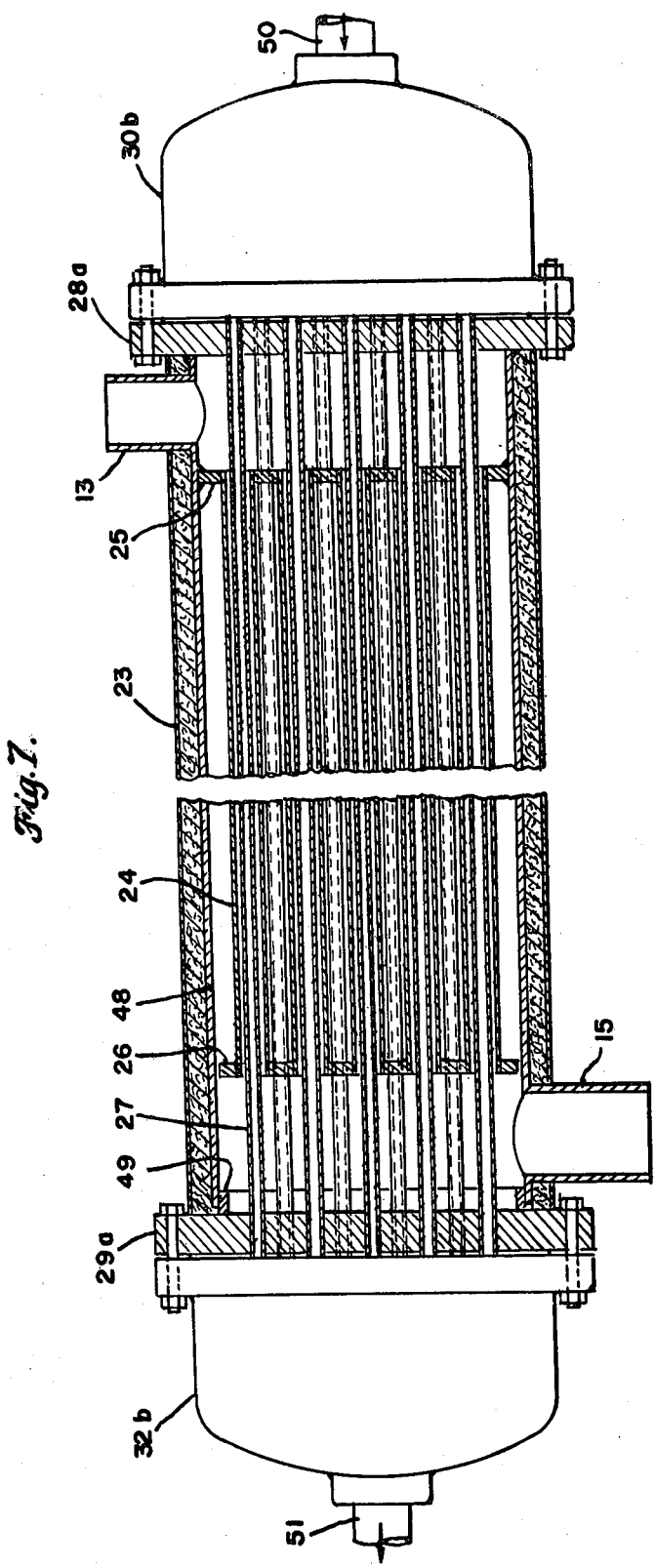

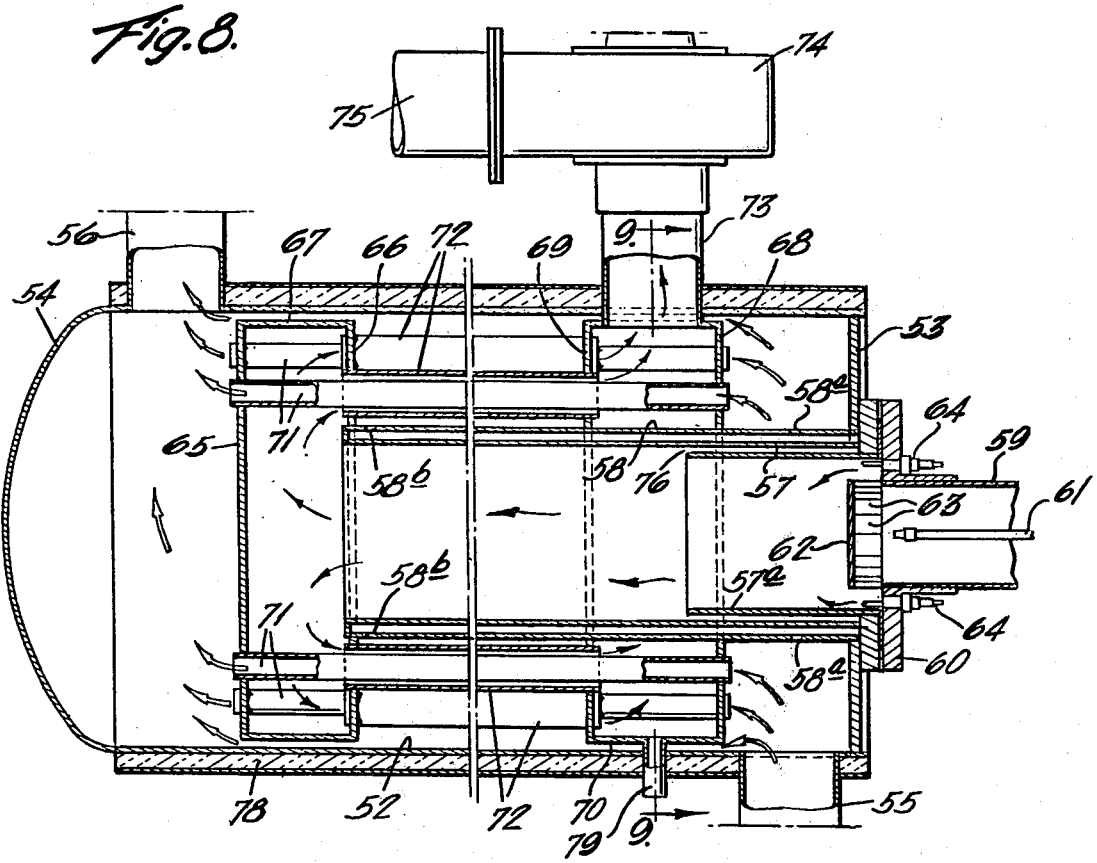
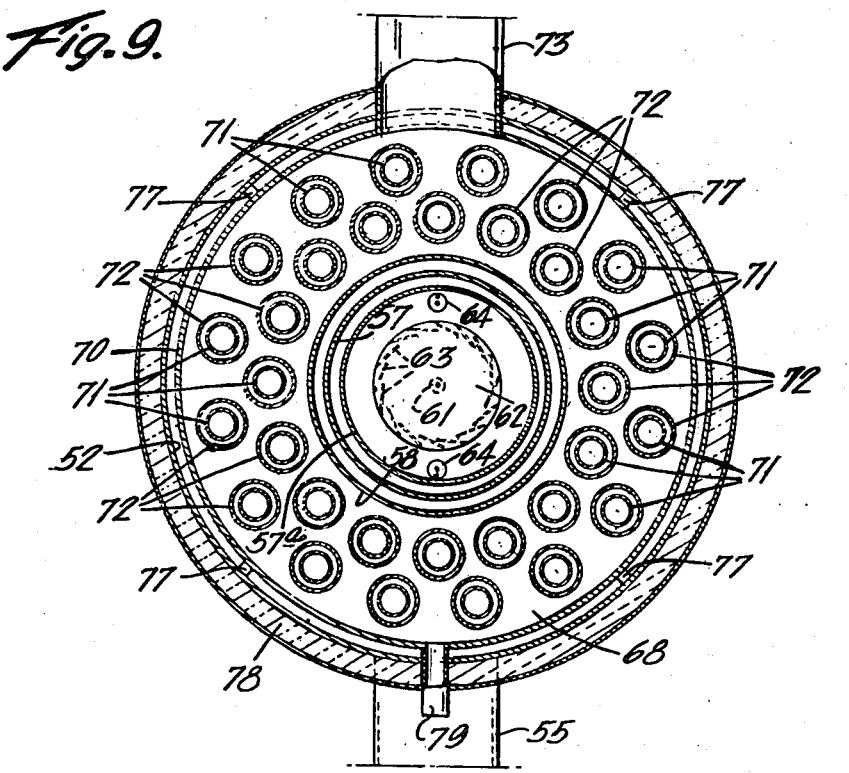

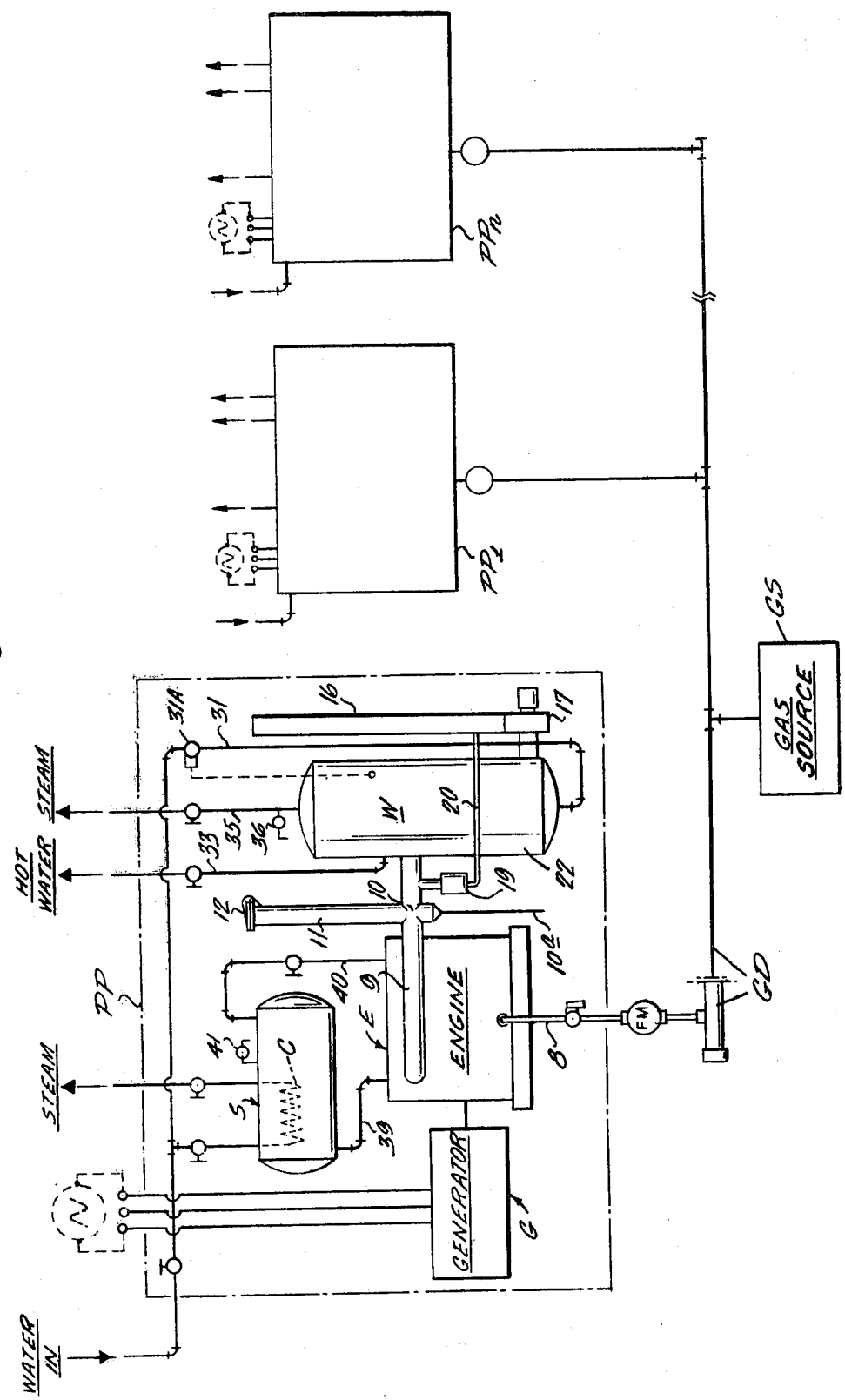

ENERGY CONVERSION SYSTEM AND COMPONENTS THEREOF

This application is a division of application Ser. No. 58,779, filed July 19, 1979 now abandoned of which is a continuation-in-part of my prior application Ser. No. 794,044, filed May 5, 1977, abandoned, which prior application was a division of application Ser. No. 568,699, filed Apr. 16, 1975, which in turn was a division of application Ser. No. 369,084, filed June 11, 1973, both of said prior applications 568,699 and 369,084 now being abandoned. The present application is also a continuation-in-part of my prior application Ser. No. 46,240 filed June 7, 1979, U.S. Pat. No. 4,271,789, which in turn is a continuation-in-part of my application Ser. No. 813,667 filed July 7, 1977, U.S. Pat. No. 4,197,831, which in its turn is a continuation of application Ser. No. 620,327 filed Oct. 7, 1975, now abandoned, which in turn is a continuation-in-part of application Ser. No. 462,094 filed Apr. 18, 1974, and issued May 24, 1977 as U.S. Pat. No. 4,025,291, which in its turn is a division of application Ser. No. 192,262 filed Oct. 26, 1971, and issued Oct. 29, 1974 as U.S. Pat. No. 3,844,270. The present application is also concerned with certain features which are disclosed not only in my applications above identified but also in my U.S. Pat. No. 3,669,079, issued June 13, 1972, and filed Aug. 6, 1970, and is also concerned with certain modifications and improvements of those features, as well as with still other features disclosed for the first time in the present continuation-in-part application.

BACKGROUND AND STATEMENT OF OBJECTS AND ADVANTAGES

The present invention relates to an improved system for conversion of energy, especially the available energy in natural gas, and is also concerned with an improved form of power package and components thereof, particularly adapted to be used in the improved energy conversion system.

In prior systems for distributing and converting the energy of natural fuels, such as natural gas, it is known to burn the gas in central power plants for the purpose of generating electricity, and the electricity is then distributed through transmission lines to various points of use where the electrical current is employed to drive a wide variety of devices such as motors for developing mechanical power or torque for use in operating machinery or for driving compressors, pumps and the like, and such electrical current is also employed for heating purposes both for industrial operations or for comfort heating and other purposes. As is well known, such prior known energy conversion and distribution systems are highly inefficient, since the ultimate consumer actually receives less than about 25% of the available energy in the gas initially burned to generate the electrical current, the remaining energy representing losses of available BTU value in the central power plant where the fuel is burned, in the transmission lines for the electrical current, in transformer losses and other miscellaneous points of inefficient conversion of the energy from one form to another.

Such losses are rapidly becoming intolerable having in mind the dwindling supplies of fuel. With this situation in mind, it has already been proposed to increase the efficiency of burning of various of fuels, particularly natural or other combustable gas, but at best, the attempts in this direction have not resulted in more than about 40% efficiency. In consequence, for most purposes, it is not presently practicable to effect a changeover on a large scale, from power distribution by electrical transmission lines, to power distribution by natural gas transmission lines.

One of the major objectives of the present invention is to provide power or power plant packages adapted to many commercial, industrial and even domestic uses, and which are of such high efficiency with respect to energy conversion that it becomes practicable to employ an energy conversion and power distribution system in which natural gas may be distributed through transmission lines to a multiplicity of points of use or local power stations, at each of which a power package is provided not only capable of high efficiency in energy conversion, but also of such character as to be readily adaptable to the varying power needs of different commercial, industrial and domestic uses.

Having in mind that the fuel with which the system and components thereof are especially adapted for use, for instance natural gas, is a fuel which, upon combustion, yields an exhaust gas containing substantial quantities of water vapor, it is contemplated according to the present invention to provide a power package to be employed at the various points to which the gas is distributed, which power package includes not only a combustion engine but further includes means for developing a supply of hot water from the heat available in the engine jacket water and/or the exhaust gases.

According to the invention a heat exchanger is employed, of special form several embodiments of which are described hereinafter, in which the engine exhaust gases and a supply of water are brought into heat exchange relation in a manner to bring the exhaust gases and thus the water vapor carried thereby down to a temperature below the dew point, in consequence of which the invention provides for the utilization of the heat of condensation for the purpose of heating the water to be employed in the establishment of the hot water supply. Although the heat exchangers herein disclosed are especially well adapted to the purpose just referred to, the disclosed heat exchangers are also highly efficient for other purposes as will be pointed out more fully hereinafter.

Additionally it is contemplated according to the present invention that the engine in which the gas is burned be connected to drive an electric generator in order to supply the requirements for electricity at the point of installation of the power package, or to drive a refrigeration compressor, or other machinery, whatever the need may be.

In addition it is contemplated, according to one embodiment to employ an engine cooling means of a type adapted to establish a source of supply of steam at a pressure appropriate for various uses where the power packages are installed.

By the utilization of a power package of the kind referred to above and more fully described hereinafter, the invention provides a capability of recovering and using as much as 85–90% of the available energy of the fuel consumed.

Certain of the heat exchangers disclosed are advantageously used in order to establish a supply of hot water by recovery of heat from the exhaust gas of the engine. The heat exchangers herein disclosed for this purpose embody a number of improvements which not only make practical high efficiency in the recovery of heat from the engine exhaust or products of combustion but which also result in improved operation and extended life of the equipment, particularly from the standpoint of reduction in deterioration under the corrosive influences of components of the products of combustion as will be further explained.

Various of the heat exchangers disclosed may be used for a variety of purposes not necessarily associated with power packages of the kind herein disclosed; and in one disclosed embodiment the heat exchanger incorporates a combustion chamber in novel interrelation to other components of the exchanger, as will be pointed out more fully hereinafter.

BRIEF DESCRIPTION OF DRAWINGS

How the foregoing, together with other objects and advantages, are obtained will be clear from the following description referring to the accompanying drawings in which, FIG. 1 is a schematic illustration of a power package incorporating a combustion engine, and an electric generator, a mechanism for establishing a supply of hot water by recovery of heat from the exhaust or products of combustion of the engine, and a mechanism for establishing a supply of steam by transfer of heat from the engine cooling system, the water heating system including the heat exchanger, as employed according to this embodiment of the invention being illustrated in this view in axial section;

FIG. 2 is a greatly enlarged transverse sectional view through certain tube elements preferably employed in the heat exchanger used for establishment of the hot water supply;

FIG. 3 is a fragmentary axial sectional view of the tube elements shown in FIG. 2;

FIG. 7 is an axial sectional view through another embodiment of heat exchanger adapted to be employed for various purposes, for instance in a power package constructed according to the present invention or in many other situations in which highly efficient heat transfer is desired;

FIG. 8 is an axial sectional view through still another embodiment of heat exchanger incorporating certain features also included in some of the other embodiments disclosed, and further incorporating a combustion chamber;

FIG. 9 is a transverse sectional view taken as indicated by the section line 9—9 on FIG. 8; and FIG. 10 is a schematic view illustrating an energy distribution system and power stations incorporated in said system, as contemplated according to the invention.

DETAILED DESCRIPTION OF DRAWINGS

Figure 4:
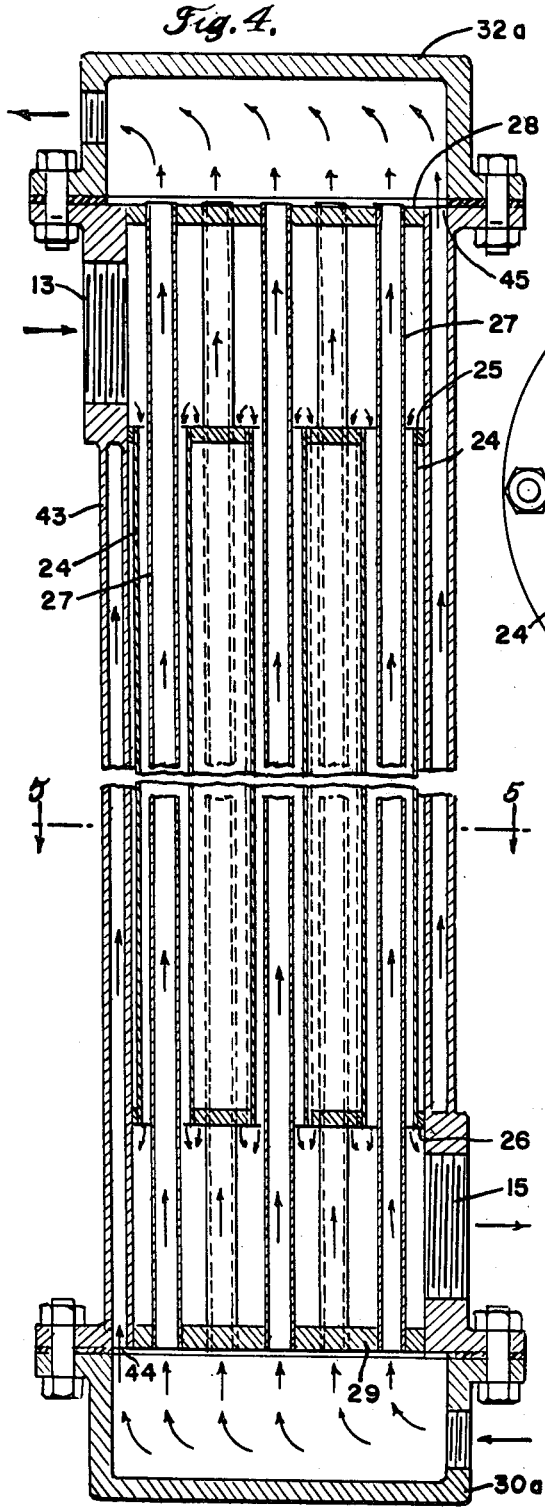
FIG. 4 is an axial sectional view of an alternative heat exchanger adapted to be employed either in the power package of FIG. 1 or for other heat transfer purposes.

Referring first to the equipment as shown in FIGS. 1, 2 and 3, it is first pointed out that a number of the components of the power package there shown are illustrated only diagrammatically or in outline. Thus, the engine is indicated in outline only, being identified by the letter E. The electric generator G is also generally indicated in outline, it being understood that this generator is being driven by the engine E. The mechanism for establishing a supply of hot water is indicated generally by the letter W, and a mechanism is also shown for developing a supply of steam, this being indicated generally by the letter S.

It is contemplated that the engine E may either comprise a piston and cylinder or internal combustion engine, or may comprise a turbine, either of such engines as is known, being operable by burning a fuel such as natural gas, and in both cases the exhaust gas from the engine contains substantial quantities of water vapor in the form of superheated steam, since the exhaust gas is discharged from the engine at a temperature frequently on the order of 1,000° to 1,200° F. The fuel supply line to the engine is diagrammatically indicated in FIG. 1 at 8, and it is to be understood that it is contemplated that this line 8 be one of many branches of a gas transmission system delivering the fuel from a central source to a multiplicity of points of use, at each of which a power package is provided incorporating at least some of the components described below in connection with FIG. 1.

The mechanical power or torque is delivered from the engine to the electric generator G in any conventional manner and this generator will serve to supply requirements for electrical current for various purposes at the point of installation of the power package. Examples of typical points of use of the power package are various commercial establishments such as food processing plants, car washes, industrial laundries, motels, and industrial establishments such as metal working and manufacturing plants. These and other categories of appropriate points of use are too numerous to list, it being noted that the invention is appropriately used at least where both electrical power and a supply of hot water or of steam are required.

The exhaust products from the engine in an arrangement such as diagrammed in FIG. 1 is delivered into the manifold 9 which is connected through the fitting 10 with the emergency exhaust discharge pipe 11 having a normally closed gravity operated closure 12. The fitting 10 also communicates with the connection 13 through a valve 14, the connection 13 being associated with the inlet of the heat exchanger to be described below which is employed for developing a supply of hot water. The gas outlet of the heat exchanger communicates through the connection 15 with the exhaust pipe 16 which is open to atmosphere. A moisture or condensate separator, advantageously of the cyclone type, is indicated at 17 at the junction of the connection 15 and the exhaust 16. The device 17 is provided with a condensate discharge pipe 18.

The valve 14 in the exhaust gas line to the heat exchanger is adapted to be controlled by the device indicated at 19, this device being controlled by the connection 20 which is extended to a temperature sensing device (not shown) in the discharge pipe 16. This valve control provides for closing the valve 14 in the event that the temperature of the gases in the discharge pipe 16 rises above a predetermined point. As will further be explained, the exhaust products are lowered in temperature from the engine discharge temperature (about 1000° to 1200° F.) down to a temperature preferably below the dew point of the exhaust products, which will vary somewhat depending upon the amount of sulphur compounds present. In the absence of sulphur compounds the dew point may approximate 140° to 160° F., but with substantial quantities of sulphur compounds the dew point may rise to as high as 200° to 250° F. The reduction in temperature in the heat exchanger is preferable at least sufficient to bring the temperature below about 200° F.; and particularly high efficiency is attained if the temperature of the exhaust products is brought down to less than 100° F. For this purpose it is necessary that the water supply be at a temperature below the temperature of the discharged combustion products. This may be accomplished by passage of the gases through a heat exchanger in the mechanism W. The control 19-20 will serve to close the valve 14 in the event the temperature of the gases in the discharge pipe 16 rises appreciably above the normal discharge temperature (of the order of 75° to 100° F. in a typical case). Such abnormal rise in temperature, produced for example by some clogging or failure of the mechanism W will thus terminate flow of the exhaust gas through the heat exchanger and will result in discharge of the exhaust gas through the connection 11, the automatic closure 12 swinging open under the influence of the pressure of the discharging gases.

Turning now to the construction of the mechanism W, it is pointed out that this comprises a heat exchanger advantageously enclosed within a shell 21 of cylindrical form. Although the shell and the heat exchanger therein may be arranged on any axis it is preferred that it be arranged vertically or at least at some angle to the horizontal, with the exhaust gas inlet connection positioned toward the upper end of the heat exchanger, and the outlet connection 15 positioned toward the lower end. The shell 21 is also provided with a jacket 22 and the intervening annular space is advantageously packed with insulation material as indicated at 23.

Within the shell 21 a plurality of outer or gas tubes 24 is provided, upper and lower tube sheets 25 and 26 being provided at the ends of the tubes 24.

A second group of tubes 27 is provided, this group being made up of inner or water tubes each one of which is extended through one of the outer or gas tubes 24. The tubes 27 are also provided with upper and lower tube sheets 28 and 29 which are arranged at the ends of the shell 21 in spaced relation to the tube sheets 25 and 26, thereby providing upper and lower headers with which the inlet and outlet connections 13 and 15 for the bundle of gas tubes is connected.

Below the lower tube sheet 29 a header 30 is provided and the inner or water tubes 27 communicate with this header in order to receive water which is supplied through the connection 31. This connection 31 is desirably made with a normal water supply system, commonly having a temperature of the order of 60° to 80° F. Advantageously, a control valve 31a is provided and preferably controlled by the temperature in the vessel provided in the header 32 described below.

Above the upper tube sheet 28 an elongated header 32 is provided, and the outside jacket wall 22 is extended to enclose this upper end of the mechanism so that the insulating layer 23 is carried throughout the entire surface of the header 32. The interior of the header 32 forms a chamber or storage vessel for hot water heated in the water tubes 27 and this water may be drawn off from the storage vessel through the valved connection 33.

The water level within the header or storage vessel 32 may fluctuate, and a gauge glass 34 may be provided for observation of the water level. A valved connection 35 may be provided from the top of the storage vessel 32 in order to provide delivery of steam. A pressure operated safety discharge valve 36 may be associated with the steam offtake, as indicated. Any well known automatic water level control may be used with this equipment.

The use of the tube-in-tube heat exchanger arrangement comprising the inner water tubes 27 and the outer gas tubes 24, with the water and gas connections arranged to provide for counterflow of the water and gas, provide an efficient heat exchange system.

As seen in FIGS. 2 and 3, in order to further increase the heat exchange efficiency, heat transfer elements 37 are extended in the space between the inner tubes 27 and the outer tubes 24. As here shown the elements comprise extensions for instance cylindrical rods or pins projecting radially in the manner of spokes and secured at their inner ends as by welding to the outside surface of the inner tube 27 and secured at their outer ends as by welding to the inner surface of the outer tube 24. These pins are preferably positioned in staggered relation lengthwise of the tubes, so that the gas flow in the annular passage between each pair of inner and outer tubes is caused to be deflected and is turbulent, thereby further enhancing and increasing heat transfer from the exhaust gas to the water in the inside tubes. Because of the heat conduction provided through the elements 37 between the outer tubes and the inner tubes, the inside surfaces of the outer tubes (as well as the outside surfaces of the inner tubes) are effective in transfer of heat from the exhaust gas to the water inside the inner tubes.

With the tube-in-tube counterflow type of heat exchanger, and especially with the heat transfer elements interconnecting the inner and outer tubes, the efficiency of heat exchange is effective to reduce the temperature of the exhaust gas to a value well below the dew point of the water vapor in the exhaust gas. Indeed the gas temperature is readily brought down to a figure approximately the same as the temperature of the water supply being introduced into the header 30 and thus into inner tubes 27. This transfer of heat from the gas to the water is thus virtually 100% efficient and since the gas temperature has been brought down below the dew point of the water vapor, the water vapor condenses and the latent heat of condensation is utilized for the purpose of establishing the supply of hot water. This is an unusual and exceptional economy and is a very significant factor in providing a system in which it becomes practicable to distribute the gas itself to the points of use at which the power packages are employed. The significance of this efficiency will appear more clearly if it be kept in mind that for each pound of natural gas burned 2.25 pounds of water vapor are produced, and upon condensation each pound of that vapor, 970.3 BTU's are released. With a typical Caterpillar model G333 engine, the engine produces 1,490 pounds of water vapor per hour, so that the latent heat of condensation in this typical example is 1,445,261 BTU's per hour.

By burning a typical gaseous fuel of the kind referred to in a combustion engine, about 30% of the potential energy is converted to shaft power and about 70% of the energy is converted to heat, and heretofore most of the heat has heretofore been lost.

Although it has heretofore been proposed to recover some heat from gas engine exhaust gases, in general the exhaust gases have been discharged from the heat exchanger at temperatures upwards of about 350° F., and frequently from 400° to 500° F. In consequence of this all of the latent heat of condensation has been rejected or released to the atmosphere, even when substantial quantities of sulphur compounds are present, with resultant dew point above the boiling point of water, for instance of the order of 250° F. There have been a number of reasons why this extensive waste of heat has occurred, one such reason being the lack of efficiency of the heat exchanger employed with engine exhaust gases. It has also been thought that since fossil fuels contain sulphur compounds, the reduction in the temperature of the exhaust gas below the dew point, with consequent condensation of water would result in combining of the water with sulphur, thereby producing sulphuric acid which is highly corrosive with respect to most metals heretofore employed in heat exchangers. In addition because of the composition of natural gases, it has been expected that carbonic acid, nitrous and nitric acids would be formed.

The present invention contemplates employment of highly efficient heat exchangers and also contemplates utilization of metals in the heat exchanger which will resist attack from carbonic, nitrous, nitric or sulphuric acid, as well as other corrosive constituents. With gases where the sulphur content is low or non-existent, it is contemplated to employ type B or C Inhibited Admiralty brass, since this is adequate to inhibit corrosion from carbonic acid.

An example of suitable Admiralty brass of type B is as follows:
Copper 70.0 to 73.0%
Tin 0.9 to 1.2%
Lead 0.07% max
Iron 0.06% max
Zinc Remainder
Arsenic 0.02 to 0.10%

In circumstances where the fuel burned by the engine has an appreciable sulphur content, it is preferred to employ inhibitors and also to use metals on which dilute sulphuric acid has little or no effect. One such highly resistant metal is identified below:
Carpenter Alloy steel-20cb-3:
Carbon 0.06% max
Manganese 2.00% max
Phosphorus 0.035% max
Sulphur 0.035% max
Silicon 1.00% max
Chromium 19.00/21.00%
Nickel 32.50/35.00%
Molybdenum 2.00/3.00%
Copper 3.00/4.00%
Columbium+Tantalum 8×C min/1.00% max
Iron Balance For protection against corrosive influences, the tubes may alternatively be coated with protective materials, such as that known as Solarcoat Polythane CP-500, as more fully disclosed in my application Ser. No. 46,240.

The arrangement of the heat exchange W to provide for downward flow of gases is of special importance in applicants system because of the provision for cooling of the exhaust products below the dew point results in formation of condensate which will flow downwardly in the gas passages by gravity for discharge at the bottom through the condensate drain 18.

With a heat exchanger arranged as above described, in a system such as shown in FIG. 1, in addition to providing for discharge of the exhaust gas at a temperature approximating the water input temperature, for instance 75° F., the water in the header 32 may readily be superheated so as to provide a temperature of the order of 350° to 375° F. and a corresponding pressure for instance 150 psi. This superheated water may thus be used as a source of steam or, as above suggested may be employed in the form of hot water. Where the temperature in the receptacle 32 is above the boiling point, another heat exchanger receiving the superheated water from the outlet 33 may also be employed in order to provide a source of water at a lower temperature. Moreover the outlet 33 may deliver the heated water to another and larger storage vessel. As another alternative a heat transfer coil may be arranged in the steam space in the vessel 32 to provide heat transfer to water passing through such a coil. In any event any of these alternatives effects substantially complete recovery of the heat from the products of combustion.

In accordance with the foregoing, by utilizing a heat transfer system of high efficiency and by coating the exchanger with special protective coatings or by constructing the heat exchanger of materials which are resistant to corrosion especially to corrosion by attack by sulphuric acid, it becomes feasible to cool the exhaust products to a temperature below the dew point, which, of course, is an essential if the latent heat of condensation is to be recovered. This in turn effects such a high degree of efficiency in the gas that it becomes practicable to distribute and utilize the power by transmission means distributing the gas itself to a multiplicity of points of use at each of which a power package of the kind described is located.

The overall efficiency may be further enhanced by additional components used in combination with those above described, especially by the provision of a means for recovering heat from the water jacket cooling system associated with the engine. This may be done in several ways, FIG. 1 being representative and showing a system for developing a supply of hot water or steam by recovering heat from the cooling system of the engine. Assuming the engine to be a piston and cylinder internal combustion engine, it is proposed to utilize a cooling system for the engine of known type in which a cooling medium, for instance distilled water, is caused to flow through a closed circulation system having a heat exchanger therein with a second flow path in heat exchange relation to the distilled water or to steam released therefrom and into which second flow path, water is introduced to be heated and then used to develop a supply of hot water or steam.

In FIG. 1, the reference numeral 38 indicates the upper portion of the engine cooling system, from which connections 40 extend upwardly to the top of the expansion tank S in which a water level is adapted to be maintained as indicated, for example, at L. A normally closed safety valved outlet 41 may be provided at the top of the tank. Water from the expansion tank may be recirculated through the engine cooling system by means of the connection 42. This system is a known type of closed circulation system sometimes referred to as an ebullient system, and the details thereof therefore need not be herein described or illustrated. It is used to provide hot water at temperatures up to 250° F., steam at pressures up to about 15 psi. Makeup water for this closed system may be introduced through the valved connection indicated at 39. Heat may be transferred to the water coil diagrammatically indicated by the letter C positioned in the tank in the steam space above the water level L. Such a coil may serve to deliver a supply of hot water to a storage vessel or may serve to deliver a supply of steam to a point of use.

With a system of the kind just referred to including the expansion tank S and the coil C, it is practical to recover heat from the cooling system for the engine and to utiliza that heat to establish a hot water or steam supply.

In the embodiment of FIG. 1 the connection 10a is a drain line serving to deliver any condensate from the offtake 11 to a point of discharge.

Figure 5:
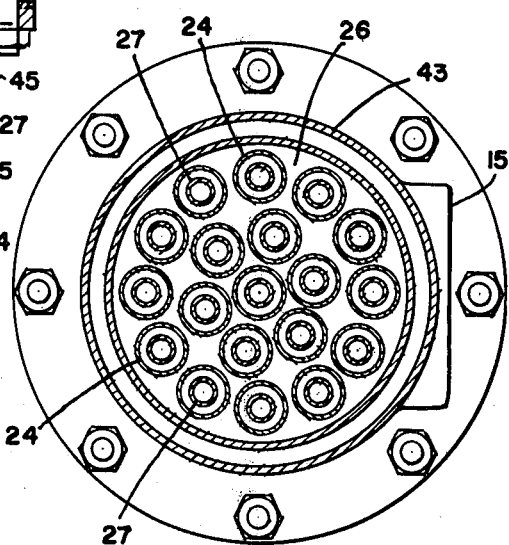
FIG. 5 is a transverse sectional view taken as indicated by the section line 5—5 on FIG. 4.
Figure 6:
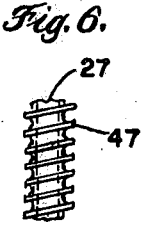
FIG. 6 is an enlarged fragmentary elevational view of one of the tube elements employed in the embodiment of FIGS. 4 and 5.

Turning now to the embodiment of the heat exchanger shown in FIGS. 4, 5 and 6, it is first noted that here also a cylindrical shell is used, this being indicated at 43, in this case, being a double walled or jacketed shell, as is shown.

The outer or gas tubes 24 are again provided with tube sheets 25 and 26. The inner or water tubes 27 are provided with upper and lower tube sheets 28 and 29, the tube bundles and tube sheets all being arranged similarly to those described above. The gas inlet connection is again indicated at 13 and the gas outlet connection at 15. The header 32a serves as the outlet header for the heated water and the header 30a serves as the inlet header for the water supply. It will be noted that the jacket space of the shell is connected with the inlet header at 44 and that the jacket space is connected with the outlet header as indicated at 45. The water being heated is therefore circulated through the jacket space, in consequence of which the tube bundle within the exchanger is in effect "immersed" in the water being heated. This further reduces heat losses.

As shown in FIG. 6 each of the inner tubes 27 is here provided with a fin structure adapted to increase its heat transfer surface area. In this case this means comprises heat transfer elements in the form of helical or threadlike projections 47 of a type which are known per se. When such a tube 27 (having the threadlike projections 47) is positioned within an outer tube 24, turbulence is imparted to the gases flowing in the annular space between the tubes. This is an advantageous way of increasing the efficiency of heat transfer to an extent providing for the desired reduction in the exhaust gas temperature to a point well below the dew point and thereby make possible the recovery of the latent heat of condensation. Such helical 47 may be used in any of the heat exchangers herein disclosed. Alternatively any of the heat exchangers may employ the pin type of elements shown at 37 in FIG. 2.

The insulation jacket 23 in the embodiment of FIG. 1 and the water jacketed shell 43 in the embodiment of FIG. 4 both serve to prevent heat losses in the region in which the heat exchange is being effected.

Turning now to FIG. 7 it is first to be noted that this figure illustrates certain details of construction more fully than the other figures and it is to be understood that certain of those details are also applicable to arrangements of the kind shown in FIGS. 1 and 4.

In the embodiment of FIG. 7 the heat exchanger is again encased within a shell 48 and the outside or gas tubes 24 are provided with tube sheets 25 and 26. It will here be seen that the tube sheet 25 is welded to the interior of the shell 48, but the tube sheet 26 is not secured in position, but is free to move axially in the shell, thereby permitting freedom for relative expansion and contraction of the tubes 24 and the shell.

The inside or water tubes 27 are also provided with tube sheets 28a and 29a, these sheets being of larger diameter than the inside of the shell. Here the tube sheet 28a is welded to the shell, but tube sheet 29a is permitted freedom to float. Advantageously the tube sheet 29a is provided with an annulus or ring 49 fitting just inside the shell and serving as a positioning element guiding the expansion and contraction of the inner tubes 27 when the tube sheet 29a floats or adjusts its position with respect to the shell and thus compensates for the relative expansion and contraction of the tube bundle and shell.

Provision for expansion and contraction of the tube bundles as described above in connection with FIG. 7 may also be utilized in the other embodiments.

The shell is provided with a gas inlet connection 13 and gas outlet connection 15 by means of which the exchanger may be coupled into the exhaust gas system in the manner illustrated in FIG. 1.

Inlet and outlet headers for the water supply are also indicated at 30b and 32b, these headers having connections 50 and 51 providing for introduction and delivery of the water being heated.

An insulation jacket 23 is also desirably provided around the shell in the embodiment of FIG. 7.

Although not illustrated in FIG. 7, it is to be understood that if desired heat exchange elements may intervene between the outer wall of the inner tube and the inner wall of the outer tube, as in FIGS. 2 and 3 and also in FIG. 6, and here again the insulation jacket serves to prevent heat losses in the region in which the heat exchange is occurring between the discharging exhaust gas and the incoming water supply.

In connection with the heat exchangers shown in FIGS. 1, 4 and 7, it will be noted that in each instance the "tube-in-tube" units are arranged and connected with headers in a manner providing for flow of hot gases through the annular space between the tubes of each unit; and for the flow in the opposite direction of the fluid to be heated (for instance water in an installation of the kind shown in FIG. 1) through the central tube of each unit.

In all three embodiments of the heat exchanger shown in FIGS. 1, 4 and 7, the shell of the heat exchanger has associated therewith an insulation jacket which will act to diminish heat loss radially from the heat exchanger as a whole. In the embodiments of FIGS. 1 and 7 this jacket comprises insulation material acting as a shield to prevent heat radiation. In the embodiment of FIG. 4 the heat exchanger is provided with a double-walled jacket through which a liquid to be heated is passed. Thus, in the case of a water heater as in the system of FIG. 1, the use of the exchanger of FIG. 4 would result in passage of the water to be heated not only through the inner tubes of each tube-in-tube unit but also through the annular jacket surrounding the exchanger. In this way the jacket serves not only to shield the interior portions of the exchanger, but also serves as one of the heat exchanger components of the system.

It will be understood that in an embodiment such as shown in FIG. 4, a layer of heat insulating material may be applied outside of the tubular water jacket.

Turning now to the embodiment shown in FIGS. 8 and 9, the heat exchanger there shown has a surrounding shell 52 with a closure 53 at one end and a closure 54 at the other end. The end portions within the shell 52 serve as headers with which the water (or other liquid) inlet and outlet connections 55 and 56 are associated.

In the embodiment of FIGS. 8 and 9 a central combustion chamber is provided, being defined by spaced inside and outside cylindrical walls 57 and 58. Toward the right as viewed in FIG. 8, an air supply connection 59 is provided, being mounted on a plate 60 serving as a closure for the right hand end of the central cylindrical combustion chamber. A fuel supply connection 61 extends into the air supply conduit 59, a jet of the fuel being discharged against the splash plate 62. The splash plate is mounted at the inner ends of a series of spaced and inclined baffle elements 63 which tend to impart a swirling motion to the incoming air and fuel as they enter the combustion chamber. One or more spark ignition devices such as indicated at 64 may be employed for igniting the air and fuel in the combustion chamber. The left hand end of the combustion chamber communicates with a header space provided between the tube sheets 65 and 66, this header space being circumferentially enclosed by an annular wall 67. Toward the opposite end of the exchanger another pair of tube sheets 68 and 69 are provided, in order to define another header space, and this space is enclosed by an annular wall 70.

The tube sheets 65 and 68 serve to secure opposite ends of the inside tube elements 71 of an annular bundle of tube-in-tube units, these tubes 71 communicating with the inlet and outlet header spaces formed in the opposite ends of the shell 52 of the exchanger. Tube sheets 66 and 69 serve to secure opposite ends of the outside tube elements 72 of the annular bundle of tube-in-tube units, these tubes 72 communicating with the inlet and outlet header spaces for the combustion gas provided between the pairs of the spaced tube sheets 65-66 and 68-69.

The flue (or combustion) gas offtake 73 is connected with the outlet header for the products of combustion and by means of the blower 74, the products of combustion are delivered through the offtake or stack 75. This blower may serve to draw the combustion air into the combustion chamber through the air supply duct 59. However, depending upon the use of the exchanger, the blower may not be needed.

Although various arrangements for the combustion chamber may be employed, it is preferred to employ a double-walled chamber, the outer wall 58 having a series of ports or apertures 58a at the right hand end as viewed in FIG. 8, and a series of ports or apertures 58b in the left hand end as viewed in FIG. 8. These series of apertures provide for circulation of liquid from the shell space toward the right hand end of the shell through the annular jacket surrounding the combustion chamber and back into the shell space toward the left hand end of the shell.

A heat shield is provided just inside of the inside wall of the combustion chamber to provide a dead air space inside of the inner wall of the combustion chamber. This heat shield is indicated at 57a and is provided for reasons as brought out in my prior U.S. Pat. No. 3,669,079 issued June 13, 1972. The dead air space is desirably vented, for instance at the left end as viewed in FIG. 8 as indicated at 76 thereby providing intercommunication or pressure equalization between the dead air space and the combustion chamber.

When the heat exchanger of FIGS. 8 and 9 is used to heat a liquid having a positive coefficient of thermal expansion, for instance oil, the ports 58a and 58b are preferably proportioned to provide greater cross sectional flow area for the ports 58a (which serve as inlet ports) than for the ports 58b (which serve as outlet ports). For example, in the use of this heat exchanger for the heating of crude oil, the cross sectional flow area of the inlet ports 58a should be about 10% greater than the cross sectional flow area of the ports 58b.

Moreover, regardless of the type of liquid being heated, the cross sectional flow area of the ports 58a and 58b should be proportioned in relation to the cross sectional flow area of the inner tubes of each tube-in-tube unit to provide for higher rate of flow through said jacket space as compared with the rate of flow through each of said inner tubes. Since the rate of heat exchange will be greater in the jacket space than in the inner tubes, this will diminish the temperature differential as between the liquid delivered into the outlet header.

The inside headers formed by the pairs of tube sheets 65-66 and 68-69, and also the annular tube bundles are positioned in spaced relation to the tubular shell wall 52 by means of spacers such as shown at 77 in FIG. 9. This provides a space for flow of the liquid being heated not only through the central tube of each tube-in-tube unit, but also in an annular space surrounding the tube bundle and extended between the tubes, so that the liquid being heated may contact the outside surfaces of all of the outer tubes 72 of the tube-in-tube units. In view of this arrangement, any tendency for heat to flow or radiate away from the inside headers or from elements of the tube bundle results in transfer of such heat to the liquid intended to be heated by the exchanger; and this provides a substantial thermal efficiency. In effect, the interior parts of the heat exchanger are "immersed" in the liquid to be heated, so that all of the heat radiated or transferred from the combustion chamber and the flue tubes necessarily is transferred to the liquid being heated. A fibrous insulation type of layer or covering 78 may also be applied outside of the tubular shell 52 of the heat exchanger.

The spacers 77 around the wall 67 serve to center the tube bundle and combustion chamber within the shell but are preferably arranged to permit axial movement of the enclosed header with respect to the header at the other end, which is anchored in position by the discharge duct 73.

The provision of a double-walled combustion chamber, with inlet and outlet openings toward opposite ends communicating with the interior space within the shell, provides further heat exchange surface for transfer of heat from the combustion and combustion products to the liquid being heated.

Since it is contemplated that for at least some purposes the gas or products of combustion delivered from the exchanger should be reduced in temperature below the dew point, provision is made for the discharge of condensate from the lower portion of the outlet header formed between the tube plates 68 and 69. For this purpose a condensate drain 79 is provided; and in addition, in order to ensure drainage, it is contemplated that the heat exchanger should be mounted so that the right hand end as viewed in FIG. 8 is somewhat lower than the left hand end in order to provide for gravity flow of the condensate forming in the flue tubes toward the right, for ultimate discharge from the drain 79. If desired the exchanger as shown in FIGS. 8 and 9 may be arranged vertically, in which event the right hand end of the unit as it appears in FIG. 8 would be presented downwardly; and in this case the condensate drain 79 may be positioned somewhat differently in order to effect drainage from the lowest region of the gas outlet header.

In the embodiment of FIGS. 8 and 9, heat transfer elements may be positioned within the annular space between the pairs of tubes, as in the other embodiment of the heat exchanger.

Turning again to the power distribution system herein disclosed, attention is now directed to the schematic or diagrammatic view of FIG. 10. It is first pointed out that as herein above brought out, very considerable fuel economy and important use of the available BTU's present in gaseous fuels, such as natural gas, may be effected by establishing a power distribution system fundamentally differing from the distribution systems now commonly in use. Thus, instead of employing gas turbine generators for developing a source of electric energy and distributing that energy through high voltage lines, the present invention contemplates distribution of natural gas or other gaseous fuel from a source thereof through a distribution system adapted to feed individual "power packages" located for example in factories, shops, car washes, stores, homes, or any other points of ultimate use of the energy.

In FIG. 10 a gas source is indicated at GS and a gas distribution system is indicated at GD. This distribution system may serve to deliver the gaseous fuel to a multiplicity of individual power packages, for example of the general type illustrated in FIG. 1 and described more fully hereinabove. Each power package PP, PP$_1$, etc., may include components of the kind shown in FIG. 1 as is indicated for one of such power packages shown schematically at PP in that figure; and the same reference characters are here used as were also used in FIG. 1.

A number of variations may be introduced in the individual power packages, according to the local needs of the installation. Thus, various different forms of heat exchangers may be employed, including not only the heat exchanger shown in FIG. 1 but also heat exchangers shown in other figures described above. In general, it is contemplated that the fuel be initially burned in a diesel type, turbine or engine adapted to operate on the gaseous fuel of the system, and that the shaft power be employed to drive an electrical generator. The available BTU's in the products of combustion of the engine are preferably employed to develop either steam or water or both. Similarly, the BTU's available in the engine cooling system are desirably employed in developing a source of water or steam or both. In this way many different needs may be satisfied, including a hot water supply for domestic or other similar purposes, house heating, and also a steam supply for various purposes such as steam cleaning. The electric generator may be used of course to supply power for lighting and for other appliances and devices.

For reasons brought out above this novel power distribution system effects very significant fuel economies, as compared with the conventional system of distributing power through high voltage electrical transmission lines.

I claim:

1. A heat exchanger for heat transfer between two fluids, the exchanger having a first bundle of tubes having tube sheets at its ends, a second bundle of tubes extended through the tubes of the first bundle and having tube sheets at its ends, the tubes of the second bundle having a smaller outside diameter than the inside diameter of the tubes of the first bundle to provide annular flow channels, the tube sheets of the second bundle being spaced axially beyond the tube sheets of the first bundle, means including the tube sheets for both bundles providing header chambers at each end of the exchanger for the tubes of the first bundle, the chamber at one end having an inlet connection for one fluid and the chamber at the other end having an outlet connection for said one fluid, and means providing headers for the tubes of the second bundle arranged axially beyond the tube sheets for the second bundle, a double walled shell, with both walls surrounding the tube bundles and having an annular chamber between the shell walls communicating with the headers for the tubes of the second bundle, the header for the second bundle at one end having an inlet connection for the other fluid and the header for the second bundle at the other end having an outlet connection for said other fluid, the inlet connections for the two fluids being located at opposite ends of the exchanger to provide directional counterflow of the two fluids respectively through the interior of the tubes of the second bundle and through said annular flow channels.

2. A heat exchanger comprising a tubular shell, a bundle of outside tubes in the shell having a pair of headers at the ends of the bundle each including transverse tube plates and a connected annular wall, the annular walls of both headers having a smaller outside diameter than the inside diameter of the shell to provide shell space surrounding the headers, one of the headers being fixed to the shell toward one end thereof and the other being mounted within the shell toward the other end thereof with freedom for relative movement axially of the shell to compensate for expansion and contraction of the tubes with respect to the shell, a bundle of inside tubes each extended through one of the outside tubes and each extended through and connected with the outer tube plates and thereby communicate with chambers serving as headers in the end portions of the shell space axially beyond the headers for the bundle of outside tubes, and inlet and outlet connections for said header chambers in the end portions of the shell for establishing flow through the bundle of inside tubes and through the shell space surrounding the headers.

3. A heat exchanger as defined in claim 2 and further including a discharge manifold connected with the header which is fixed in the shell.

4. A heat exchanger as defined in claim 2 and further including inlet means connected with the header which is movable in the shell and is extended therefrom axially of the shell toward the other end of the shell.

5. A heat exchanger as defined in claim 4 in which the exchanger incorporates an interior combustion chamber having a gas discharge delivering products of combustion to said inlet means.

6. A heat exchanger for use in a transfer of heat from gaseous products of combustion to a liquid to be heated, comprising a tubular shell, a bundle of tubes in the shell having tube sheets toward opposite ends of the shell and with inlet and outlet headers for the liquid to be heated positioned beyond the tube sheets to provide for flow of the liquid in one direction through the tubes of said bundles, individual flue tubes in spaced surrounding relation to the individual tubes of said bundle with tube sheets toward opposite ends thereof and with inlet and outlet headers for the gaseous products of combustion positioned within the shell between the headers for the liquid to provide a flow of the gaseous combustion products in a direction through the flue tubes opposite to the direction of flow of the liquid through the tubes of said bundle, a combustion chamber in an internal region of the exchanger, and means for introducing fuel and air into the combustion chamber in the region of the end of the heat exchanger toward which the outlet header for the combustion gases is located, the combustion chamber being extended through the interior of the exchanger and being in communication with the inlet header for the products of combustion to deliver the combustion products thereto, at least a portion of the shell space surrounding the tubes being in communication with the headers for the liquid to be heated.

7. A heat exchanger for use in transfer of heat from gaseous products of combustion to a liquid to be heated, comprising a tubular shell, a bundle of tubes in the shell having tube sheets toward opposite ends of the shell and with inlet and outlet headers for the liquid to be heated positioned beyond the tube sheets to provide for flow of the liquid in one direction through the tubes of said bundle, and individual flue tubes in spaced surrounding relation to the individual tubes of said bundle with tube sheets toward opposite ends thereof and with inlet and outlet headers for the gaseous products of combustion positioned within the shell between the headers for the liquid to provide for flow of the gaseous combustion products in a direction through the flow tubes opposite to the direction of flow of the liquid through the tubes of said bundle, the tube sheets toward each end of the shell being spaced from each other and provided with an annular wall connected therewith to define header chambers for the products of combustion, said annular wall toward each end of the shell being proportioned to leave an annular space between each header chamber and the inside of the tubular shell and thereby provide for communication of shell space surrounding the flue tubes with the headers for the liquid to be heated.

8. A heat exchanger for transfer of heat from hot gases to a liquid, comprising a plurality of tube-in-tube units each comprising an inner tube for the liquid to be heated and an outer tube in spaced surrounding relation to the inner tube, gas inlet and gas outlet header means at opposite ends of the outer tubes, liquid inlet and liquid outlet header means at opposite ends of the inner tubes, the gas header means being located between the liquid header means, the tube-in-tube units being arranged in an annular bundle surrounding a central region of the exchanger, a combustion chamber lying in said central region within the annular bundle, and a wall structure defining said combustion chamber and including spaced inner and outer walls providing an annular jacket space between the walls and having port means establishing communication between one end of said jacket space and the inlet header means for the liquid to be heated and further port means establishing communication between the other end of said jacket space and the outlet header means for the liquid to be heated.

9. A heat exchanger as defined in claim 8 in which the combustion chamber communicates with the inlet header means for the gas and providing for delivery of the products of combustion from the combustion chamber to the inlet header means for the gas.

10. A heat exchanger as defined in claim 8 and further including a shell surrounding the bundle of tube-in-tube units, the inlet and outlet header means for the liquid to be heated being located in the end portions of the shell beyond the gas inlet and gas outlet header means.

11. A heat exchanger as defined in claim 10 in which the shell space surrounding the bundle of tube-in-tube units between the gas inlet and outlet header means is in communication with the liquid and outlet header means thereby providing for heat exchange from the gas both inwardly through the wall of the inner tube of each tube-in-tube unit and also outwardly through the wall of the outer tube of each tube-in-tube unit.

12. A heat exchanger as defined in claim 11 in which the gas inlet and gas outlet header means are spaced from the inner wall of the shell in at least a substantial portion of the circumference of the shell and thereby provide for heat exchange from the gas in the gas header means radially outwardly to the liquid surrounding the gas inlet and gas outlet headermeans.

13. A heat exchanger as defined in claim 8 in which the cross sectional flow area of the port means between the jacket space and the outlet header means for the liquid is greater than the cross sectional flow area of the port means between the jacket space and the inlet header means for the liquid.

14. A heat exchanger as defined in claim 8 in which the cross sectional flow area of the port means establishing communication between the jacket space and the inlet and outlet header means for the liquid is proportioned in relation to the cross sectional flow area of the inner tube of each tube-in-tube unit to provide for higher rate of flow through said jacket space as compared with the rate of flow through each of said inner tubes.

* * * * *